May 18, 1965   E. A. PIRLOT   3,184,070
APPARATUS FOR SUPPORTING GLASS SHEETS
Filed Nov. 26, 1962   6 Sheets-Sheet 2

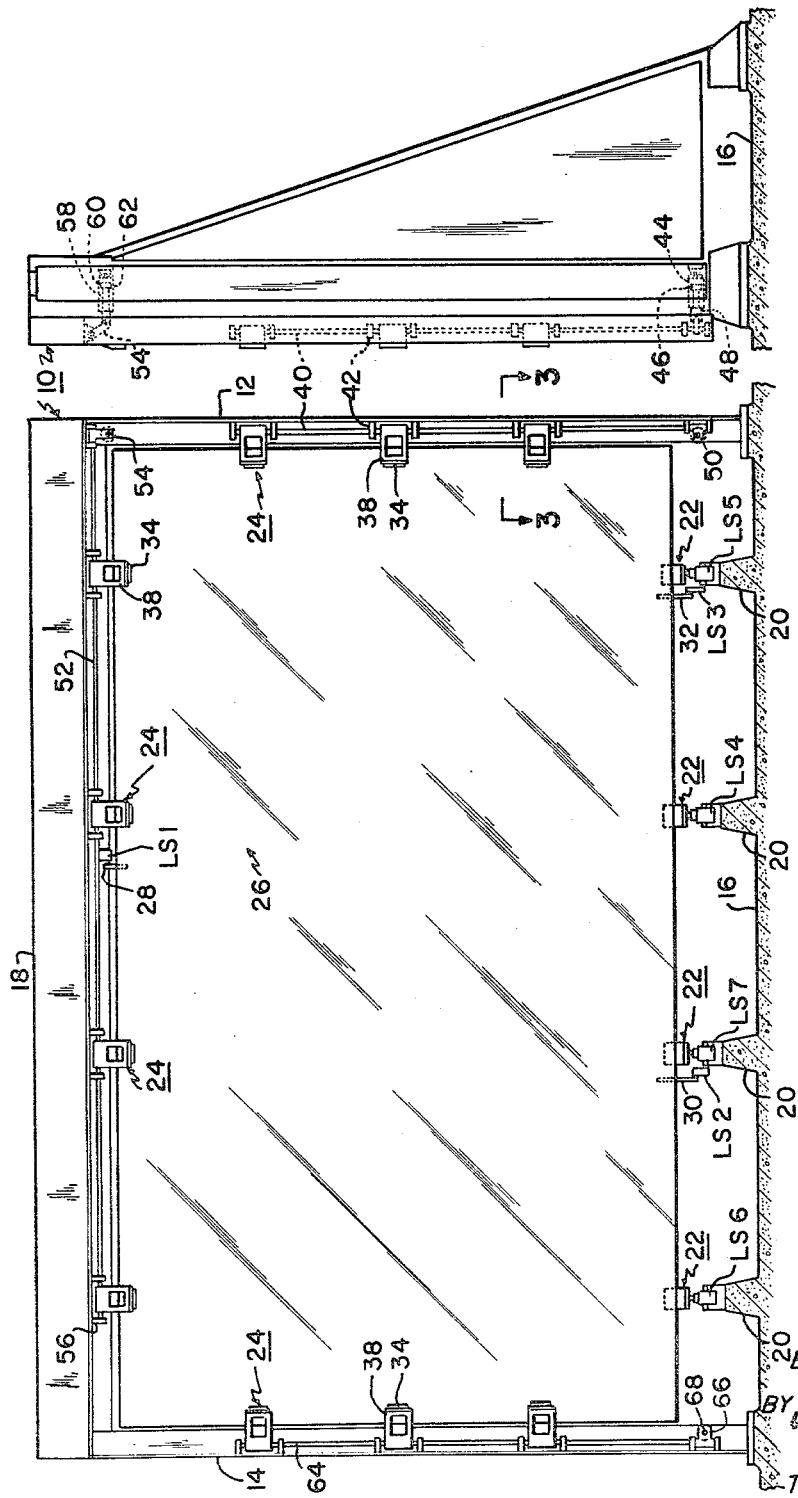

INVENTOR.
Edmond A. Pirlot
BY Webb, Mackey & Burden
THEIR ATTORNEYS

May 18, 1965   E. A. PIRLOT   3,184,070
APPARATUS FOR SUPPORTING GLASS SHEETS
Filed Nov. 26, 1962   6 Sheets-Sheet 3

INVENTOR.
Edmond A. Pirlot
BY Webb, Mackey & Burden
THEIR ATTORNEYS

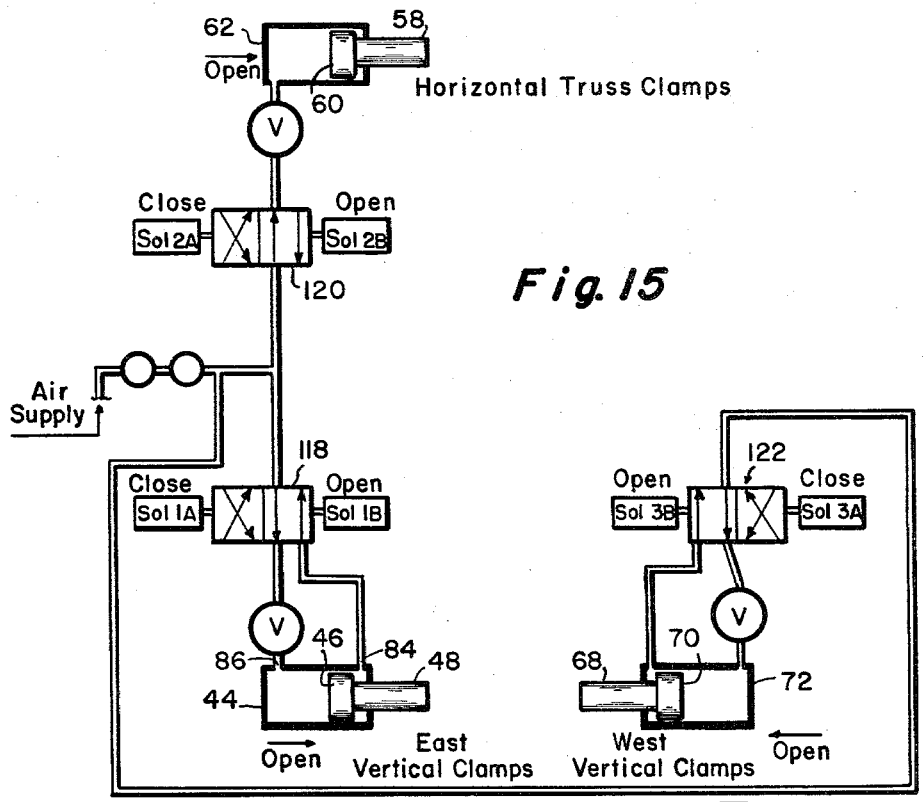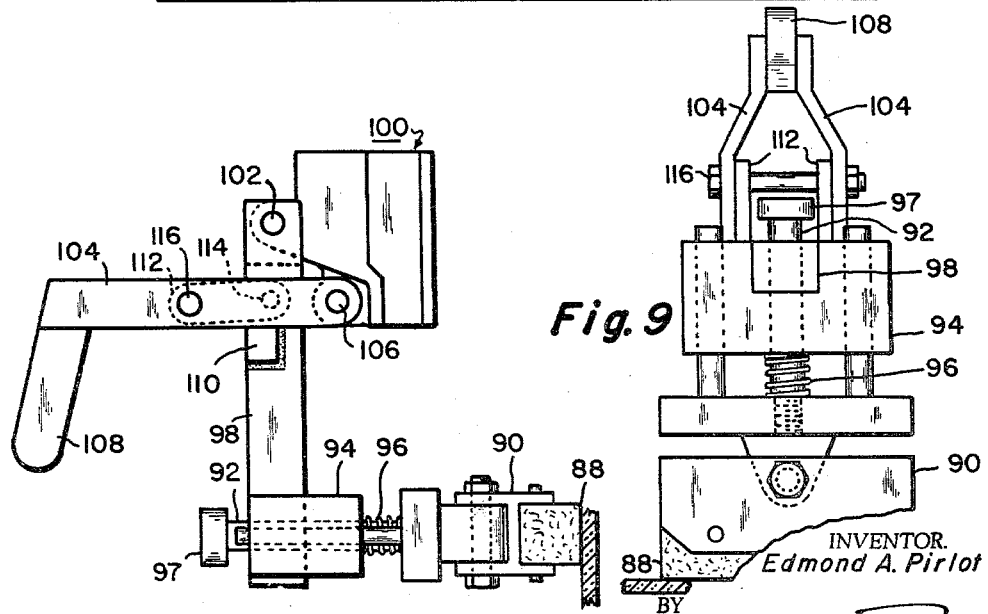

INVENTOR.
Edmond A. Pirlot
BY
THEIR ATTORNEYS

United States Patent Office 3,184,070
Patented May 18, 1965

3,184,070
APPARATUS FOR SUPPORTING GLASS SHEETS
Edmond A. Pirlot, Kingsport, Tenn., assignor to American-Saint Gobain Corporation, Kingsport, Tenn., a corporation of Delaware
Filed Nov. 26, 1962, Ser. No. 240,106
15 Claims. (Cl. 211—41)

This invention relates to a method and apparatus associated therewith for supporting and inspecting substantially the entire surface of large sheets or plates and more particularly to a method and apparatus associated therewith for supporting large sheets of glass in a substantially vertical plane and inspecting substantially the entire surface of the glass sheet while supporting the sheet in a vertical position.

In the manufacture of glass, the large sheets are visually inspected for imperfections. It is highly desirable to process and inspect as large a sheet of glass as is possible so that the large sheet can be cut into preselected size. The size of the sheet is especially important when there are imperfections in portions of the glass sheet. It is the present practice to remove the imperfections by cutting rectangular strips from the sheets. The strips include the imperfection and are returned to the glass making furnace as cullet. The remaining portion of the sheet is then cut into preselected sizes. It is apparent where large sized sheets are processed and inspected, maximum sized defect-free sheets are obtainable when compared with the processing and inspecting of smaller sized sheets.

In processing and inspecting large sheets of glass, a problem is encountered in positioning and supporting the large sheets for visual inspection thereof. Further difficulty is encountered in visually inspecting the entire surface of the glass sheet. This includes the portion of the glass sheet beneath the clamping or supporting means. It has been found by employing the apparatus herein disclosed that large sheets of glass can be readily positioned in a substantially vertical plane within a frame or holding device and the portions of the glass beneath the supporting means can be visually inspected for imperfections. In this manner the peripheral edge portion of the large glass sheet can be retained if it is free of imperfections.

Briefly, the invention comprises a glass sheet inspection frame having a plurality of clamps extending inwardly therefrom. The clamps are arranged to secure the peripheral edge portion of the glass sheet therebetween and support the glass sheet in a substantially vertical plane. A plurality of edge supporting pads are arranged on the floor within the periphery of the frame. The frame and the edge supporting pads have position sensing means associated therewith which are actuated by the glass sheet when it is in a predetermined planar relationship with the frame. The edge supporting pads have weight sensing means associated therewith which are responsive to the weight of the glass sheet positioned therein. The position sensing means are arranged to provide a visual signal when the glass sheet is in the predetermined vertical plane. The weight sensing means are interconnected with the clamps and actuate the clamps when the weight of the glass sheet is impressed on the weight sensing means, and in this manner the lower edge of the glass sheet is supported on the edge supporting pads and the remaining peripheral edge portion of the glass sheet is supported by the clamps. The clamps include actuating means which are arranged to selectively open some of the clamps while the remaining clamps are maintained in a closed position. With this arrangement, visual inspection of the glass beneath the clamps is possible while the glass plate remains supported by the remaining closed clamps. Interlock means are provided to limit the number of clamps that may be opened at any one time while the glass sheet is being supported within the inspection frame so that adequate support is assured for the glass during the inspection process and the inspector is not endangered by the glass sheet falling out of the inspection frame.

The clamps include a front surface engaging portion and a rear surface engaging portion. The front surface engaging portion of the clamps secured to the respective vertical and horizontal portions of the frame are interconnected and actuated by a single actuator for each member of the frame. With this arragnerent, the front surface engaging portions of all of the clamps associated with either one of the vertical members or the top horizontal member are movable relative to the front surface of the glass sheet. The rear surface engaging portion of each clamp is independently controlled and is normally maintained in a closed position against the rear surface of the glass sheet. The rear surface engaging portion of each clamp may be manually withdrawn from the rear surface of the glass sheet by means of a novel lever assembly. The rear surface engaging portion of the clamps, therefore, provides a backing surface for the glass sheet as it is positioned within the inspection frame. The rear surface engaging portions of each clamp may be manually withdrawn from the rear surface to inspect the portion of the glass sheet therebeneath. It will become apparent with the apparatus hereinafter described that it is now possible to inspect substantially the entire sheet of glass while maintaining it adequately supported in a substantially vertical position within the inspection frame.

The method and apparatus which comprise this invention accomplish the foregoing and other functions in a novel way as will now be explained. Further features, objects and advantages will either be specifically pointed out or become apparent when, for a better understanding of the invention, reference is made to the following written description, taken in conjunction with the accompanying drawings which form a part hereof, and in which:

FIGURE 1 is a view in front elevation of an inspection frame embodying features of the present invention with a glass sheet positioned therein and supported by the clamps and edge supporting pads;

FIGURE 2 is a view in side elevation of the inspection frame illustrated in FIGURE 1;

FIGURE 8 is a fragmentary detail view in side elevation of the pivot arrangement for the rear surface engaging portion of the clamp;

FIGURE 9 is a view in front elevation of the rear surface engaging portion of the clamp;

FIGURE 15 is a schematic diagram of the actuator means for the various clamps and the controls therefor.

Figure 4:
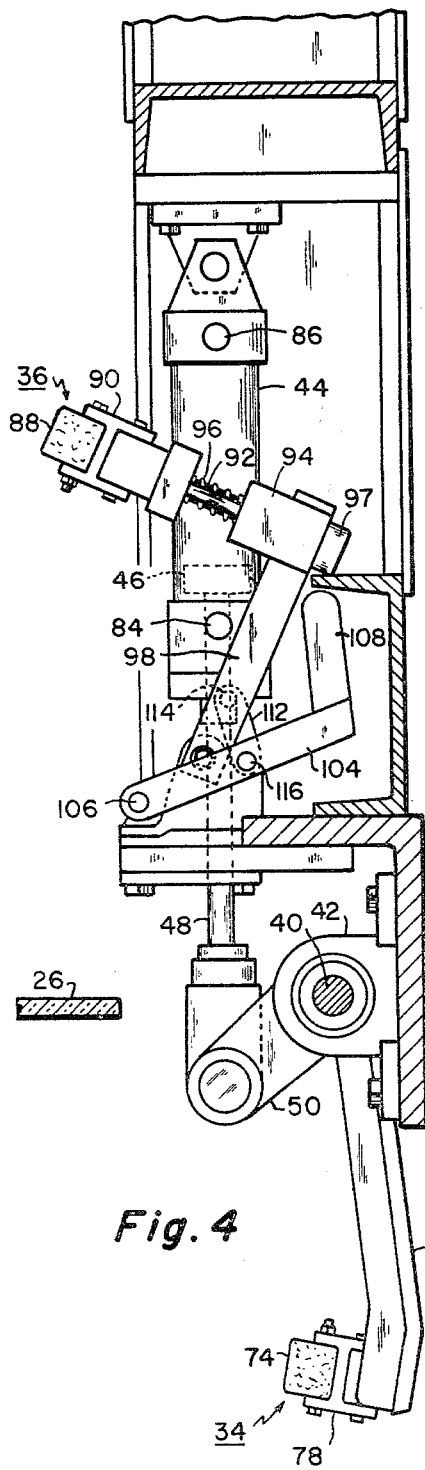
FIGURE 4 is a view similar to FIGURE 3 illustrating the clamp in an open or disengaged position.

Referring to the drawings and particularly to FIGURES 1 and 2, there is illustrated the improved inspection frame generally designated by the numeral 10 which has a pair of vertical pedestals 12 and 14 secured to the floor 16 by suitable securing means. For convenience, the pedestals 12 and 14 will hereinafter be referred to as east pedestal 12 and west pedestal 14. A top horizontal truss member 18 is secured to the top portions of the vertical pedestals 12 and 14 in a suitable manner. Within the confines of the frame 10 there are a plurality of raised bearing surfaces 20 formed as a part of the floor 16. Edge supporting pads and weight sensors generally designated by the numeral 22 are secured to the raised bearing surfaces 20 and are arranged to support the bottom horizontal edge of the glass sheet.

The vertical pedestals 12 and 14 and the horizontal truss 18 all have a plurality of clamps generally designated by the numeral 24 extending inwardly therefrom. The clamps 24 are illustrated in detail in FIGURES 3 and 4 and are arranged to clamp the peripheral edge of a glass sheet 26 and support the glass sheet 26 within the confines of the inspection frame 10.

A position sensor 28 is connected to the truss 18 and extends downwardly therefrom. The position sensor 28 has a limit switch LS1 associated therewith. Other position sensors 30 and 32 are secured to certain of the edge supporting pads 22 and have limit switches LS2 and LS3 associated therewith. The position sensors 28, 30 and 32 are arranged to actuate respective limit switches LS1, LS2 and LS3 when the glass sheet 26 is in a predetermined planar relationship with the frame 10.

Weight sensors 22 have limit switches LS4, LS5, LS6 and LS7 associated therewith. The limit switches LS4, LS5, LS6 and LS7 are actuated by the weight of the glass sheet and are arranged to close the clamps 24 in a predetermined manner as will later be explained in greater detail.

Figure 3:
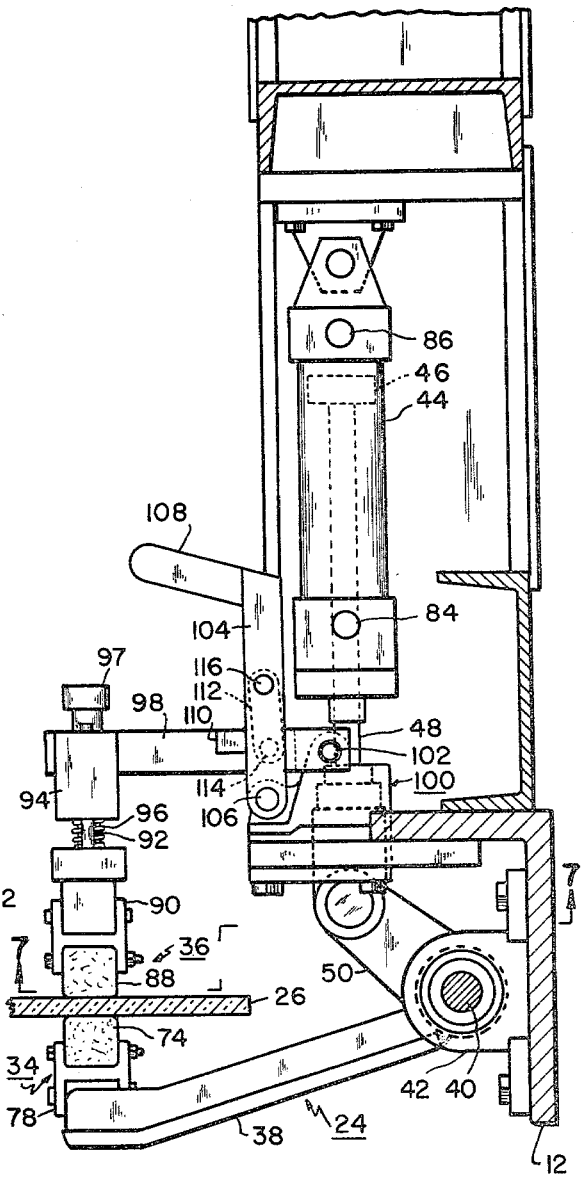
FIGURE 3 is a view in section taken along the line 3—3 of FIGURE 1 illustrating the improved clamp in an engaged position.
Figure 5:
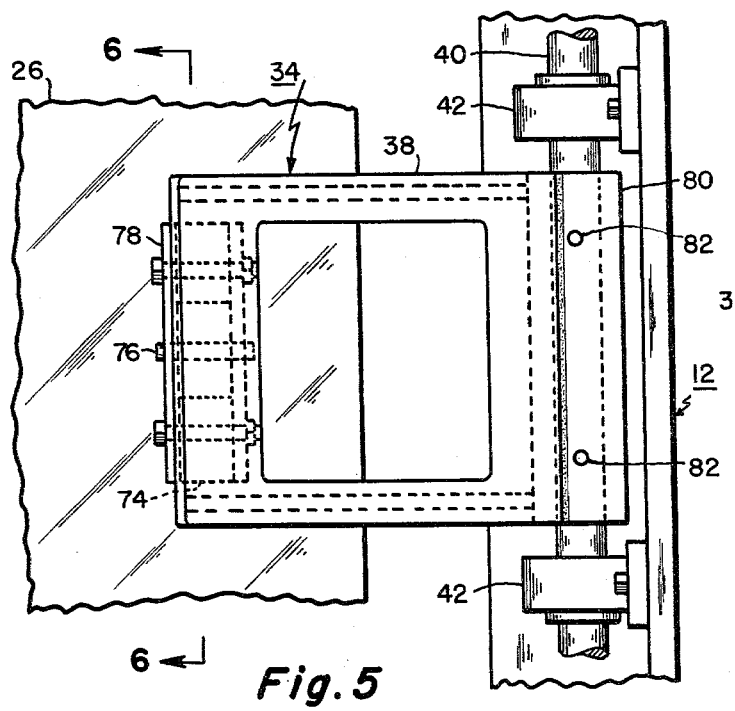
FIGURE 5 is an enlarged fragmentary view in front elevation of the front surface engaging portion of one of the clamps.
Figure 6:
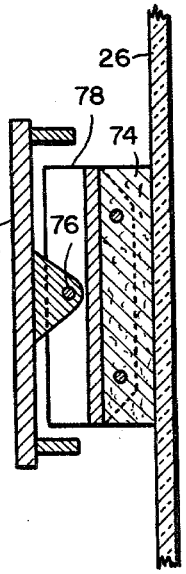
FIGURE 6 is a fragmentary view in section taken along the line 6—6 of FIGURE 5 illustrating the arrangement of the front surface engaging portion of the clamp that is secured to the crank arm.
Figure 7:
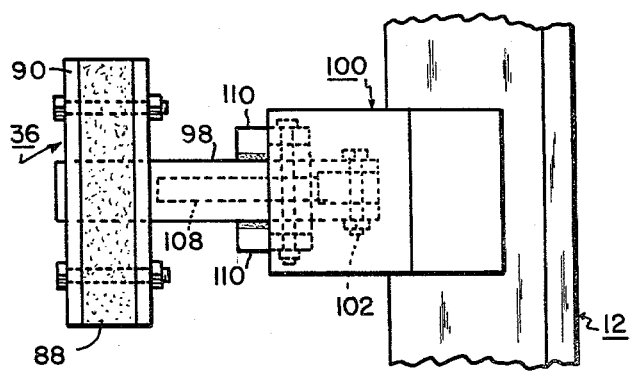
FIGURE 7 is a fragmentary section taken along the line 7—7 of FIGURE 3 illustrating the rear surface engaging portion of the clamp.

Referring briefly to FIGURE 3, the clamps 24 have a front surface engaging portion generally designated by the numeral 34 and a rear surface engaging portion 36. The front surface engaging portion 34 has a crank arm 38 which is arranged to be nonrotatably secured to an actuating rod.

Referring again to FIGURE 1, the east pedestal 12 has an actuating rod 40 which is rotatably mounted in a plurality of bearings 42 so that the rod 40 is rotatable relative to the east pedestal 12. The clamp crank arms 38 are nonrotatably secured to the rod 40 so that rotation of rod 40 in one direction moves the front surface engaging portion 34 away from the front surface of glass sheet 26 and the rotation of rod 40 in the opposite direction moves the clamp front surface engaging portion 34 toward the front surface of glass sheet 26. The east pedestal 12 has a cylinder 44 pivotally secured thereto adjacent its lower portion. Piston 46 is positioned in the cylinder 44 and has an actuator rod 48 secured thereto. The rod 48 is pivotally secured to a crank arm 50. The crank arm, in turn, is nonrotatably secured to the actuator rod 40. With this arrangement the front surface engaging portion of all clamps 24 associated with east pedestal 12 are moved in unison toward or away from the glass sheet 26. There is a similar arrangement for the clamps 24 depending from the horizontal truss 18. The front surface engaging portions 34 of clamps 24 are nonrotatably secured to an actuating rod 52 which, in turn, is secured to a crank arm 54. The rod 52 is suitably supported by bearings 56. The crank arm 54 is connected to a piston rod 58 which is actuated by piston 60 within cylinder 62.

A similar arrangement is provided for west pedestal 14 wherein rod 64 is rotatably secured to pedestal 14 and nonrotatably secured to the front surface engaging portion 34 of clamps 24 associated with pedestal 14. The rod 64, in turn, is nonrotatably connected to a crank arm 66. A piston rod 68 (see diagrammatic showing in FIGURE 15) is connected to a piston 70 which is positioned within cylinder 72. The front surface engaging portions 34 of clamps 24 associated with east pedestal 12 are movable into engagement with the front suruface of glass sheet 26 simultaneously by movement of piston rod 48. Similarly, all of the front surface engaging portions 34 of clamp 24 associated with horizontal truss 18 are movable relative to the front surface of glass sheet 26 by movement of piston rod 58. The front surface engaging portion 34 of clamps 24 associated with west pedestal 14 are similarly movable in relation to front surface of glass sheet 26 by movement of piston rod 68. In this manner all of the clamp front surface engaging portions 34 associated with east pedestal 12 or horizontal truss 18 or west pedestal 14 are movable relative to the front surface of glass sheet 26.

The clamps 24 are of substantially the same construction and a detailed description of the clamp 24 associated with the east pedestal 12 will now be set forth. Referring to FIGURES 3-9 the clamp 24 has a front surface engaging portion 34 and a rear surface engaging portion 36. The front surface engaging portion 34 has a rectangular pad 74 of soft material pivotally secured to the rectangular crank arm 38 by means of pivot connection 76 (see FIGURES 5 and 6). With this pivotal arrangement between pad 74 and crank arm 38, the pad 74 will abut the front surface of glass sheet 26 throughout its length and provide a firm contact therebetween. The pads 74 are secured to a pad mount 78 in a manner that the pad, when worn, may be replaced. The rectangular crank arm 38 has a cylindrical portion 80 through which rod 40 extends. Suitable means such as set screws 82 fixedly secure the crank arm 38 to the rod 40 for rotation therewith. The bearings 42 are positioned on opposite sides of the rectangular crank arm 38 and suitably support the rod 40 therein. FIGURE 4 illustrates the crank arm 38 moved to the open position and FIGURE 3 illustrates the crank arm 38 in its closed position in clamping relation with the front surface of the glass sheet 26. The rod 40 is rotated by means of crank arm 50 which is non-rotatably secured to the rod 40 and pivotally secured to the actuator piston rod 48 by a suitable pivot connection. In FIGURE 3 wherein the crank arm is illustrated in its closed surface engaging position, the piston rod 48 is in a retracted position. In FIGURE 4 where the crank arm 38 is illustrated in an open position, the piston rod 48 is illustrated in an extended position. The cylinder 44 has inlet ports 84 and 86 which are connected to suitable sources of pressurized fluid (see FIGURE 15).

The clamp rear surface engaging portion 36 is illustrated in FIGURES 3, 4, 7, 8 and 9 and includes a rectangular pad 88 which is arranged to abut the rear surface of the glass sheet 26. The pad 88 is secured to a pad mount 90 which has a rod-like member 92 extending rearwardly therefrom. The rod-like member is movably secured to a shock mount 94 in a manner that the pad mount 90 can move toward and away from the shock mount 94. A coil spring 96 extends around the rod-like member 92 and urges the pad mount 90 away from the shock mount 94. The tension of spring 96 is adjustable by means of a suitable adjustment means 97 connected to shock mount 94. In this manner the relative cushioning effect of the pad 88 through the spring 96 may be adjusted.

The shock mount 94 is secured to one end of a lever 98 which, in turn, has its other end pivotally secured to a fixed support 100 by means of a pivot connection 102. The pivot support 100 is secured to the east pedestal 12 in a suitable manner.

An actuating lever 104 is secured at one end of the support 100 by means of a pivot connection 106 and has a handle portion 108 extending therefrom adjacent the other portion. A suitable stop member 110 extends outwardly from the lever 98 and serves to maintain the clamp rear surface engaging portion 36 in operative relation with the rear surface of glass sheet 26. A link 112 interconnects the levers 98 and 104 by means of pivot connections 114 and 116.

The link-lever arrangement is such that the actuating lever 104 is over center when it abuts the stop 110 on lever 98 so that a force exerted on pad 88 will not move the clamp rear surface engaging portion 36 relative to the frame 10. In this manner the rear surface engaging portion 36 serves as a backing for the glass sheets as they are positioned within the periphery of frame 10. To move the clamp rear surface engaging portion 36 away from the rear surface of glass sheet 26, the lever 104 is rotated in a clockwise direction as is illustrated in FIGURE 4. To close the rear surface engaging portion 36, the lever 104 is rotated in a counterclockwise direction until it abuts stop member 110 on lever 98.

FIGURES 10–13 illustrate the edge supporting pads and weight sensors 22 that are secured to the raised bearing surfaces 20 which form a portion of the floor 16. The bearing surface 20 has a central recessed portion 124 in which there is positioned a box-like securing member 126 that has depending legs 128 secured in the concrete of the bearing surface 20. The securing device has a plurality of apertures therethrough which are arranged to have bolts 130 secured therein. A plurality of rectangular pads 132 are positioned on the top of bearing surface 20 and secured thereto by means of bolts 130. Top pad 132 has an upwardly extending cylinder 134 in which there is positioned a coil spring 136. The top pad 132 has a pair of threaded apertures 138 into which aligning and retaining bolts 140 are secured. The top pad 132 has a depending end portion 142 to which a limit switch, for example limit switch LS4, is secured. The weight sensor comprises a base member 144 which has a downwardly depending cylindrical member 146. The cylindrical member 146 has an inner cylindrical bearing surface 148. The cylindrical member 146 is positioned in overlying relation with member 134 and is movable vertically relative thereto. The spring 136 urges the base 144 upwardly and is restrained in operative position by bolts 140. A resilient pad 150 is secured to the base member 144 by means of countersunk bolts 152. Extending upwardly from the base member 144 is a vertical plate 154 which is maintained in its vertical position by means of gusset plate 156. The pad 150 is in abutting relation with the front surface of plate 154. Above pad 150 the plate 154 has a second pad 158 secured thereto and extending laterally therefrom. The pad 158 is arranged to abut the rear surface of the glass sheet 26. With this arrangement, the glass sheet 26 is moved into abutting relation with the pad 158 secured to vertical plate 154 and is lowered onto pad 150 secured to horizontal base member 144. The weight of the glass sheet 26 moves the base plate 144 downwardly against the opposed force of spring 136 and actuates limit switch LS4.

Figure 10:
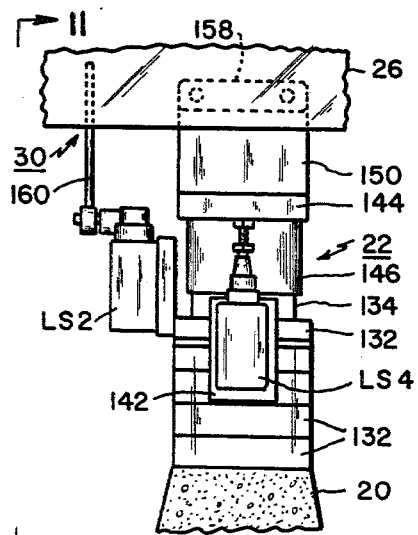
FIGURE 10 is an enlarged view in front elevation of the glass sheet edge supporting pad illustrating a position sensor secured thereto.
Figure 11:
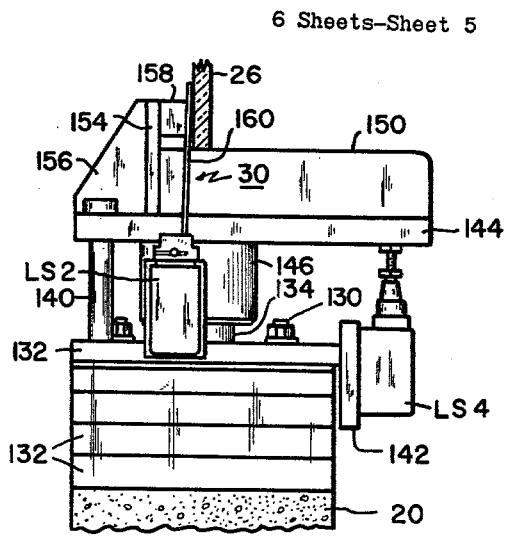
FIGURE 11 is a view in side elevation of the edge supporting pad taken along the line 11—11 in FIGURE 10.
Figure 12:
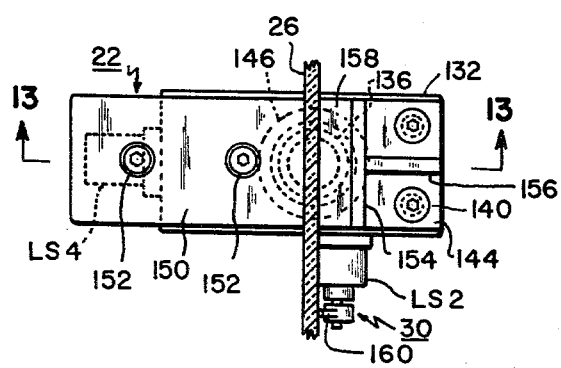
FIGURE 12 is a fragmentary top view of the edge supporting pad illustrated in FIGURES 10 and 11.
Figure 13:
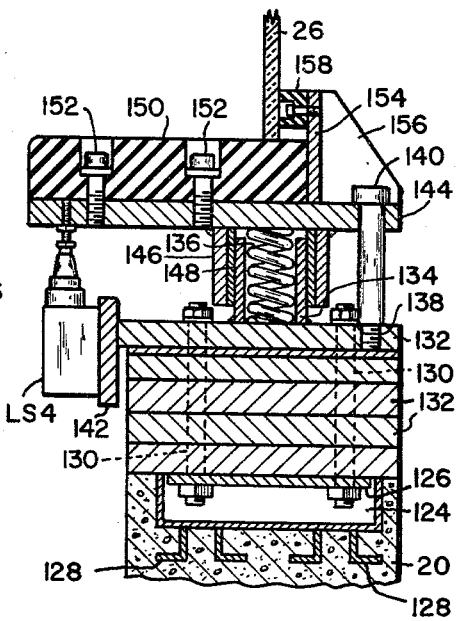
FIGURE 13 is a view in section taken along the line 13—13 in FIGURE 12 illustrating in detail the weight sensing portion of the edge supporting pad and the resilient connection of the edge supporting pad to the bearing member formed in the floor.

In FIGURES 10 and 11, the position sensor 30 is illustrated as having a sensing finger 160 extending upwardly and inwardly toward the front of base member 144. The finger 160 is urged in a counterclockwise direction by suitable spring means (not shown) to a position where limit switch LS2 is open. The limit switch LS2 is secured to top pad 132 in any suitable manner. As the glass sheet 26 moves into abutting relation with the pad 158 secured to vertical plate 154, the finger 160 of position sensor 30 is moved in a counterclockwise direction a sufficient distance to actuate limit switch LS2.

The schematism of the pressurized fluid circuit employed to actuate the clamps on the horizontal truss 18 and on the east pedestal 12 and west pedestal 14 is illustrated in FIGURE 15. The respective cylinders 44, 62 and 72 are illustrated as having a pair of inlet ports adjacent their end portions. Pistons 46, 60 and 70 are movable within the respective cylinders to actuate the clamps, as heretofore described. Control valves schematically illustrated at 118, 120 and 122 control the inlet into which the conduit supplying the pressurized fluid is connected. The east pedestal clamps are controlled by solenoids 1A and 1B. When solenoid 1A is actuated, the piston 46 retracts within cylinder 44 and closes the clamps. When solenoid 1B is actuated, piston 46 moves outwardly in the cylinder 44 as is illustrated in FIGURE 15 and the clamps are opened. In a similar manner, solenoids 2A and 2B control the closing and opening of the clamps associated with the top truss 18. Likewise, solenoids 3A and 3B through valve 122 control the position of the clamps on west pedestal 14. A suitable fluid under pressure such as air or the like is supplied to the various valves 118, 120 and 122 by suitable conduit means as is illustrated in FIGURE 15.

Figure 14:
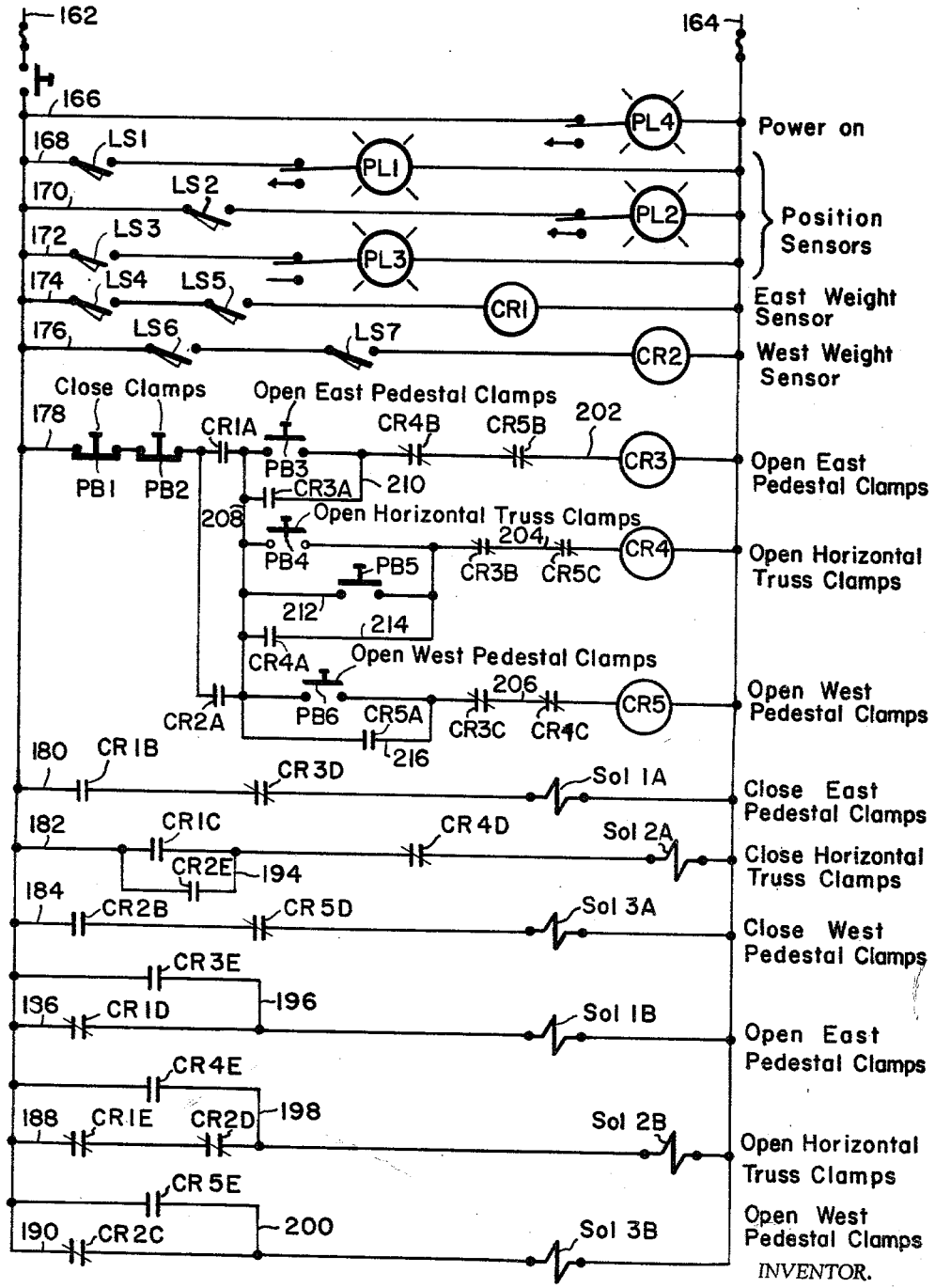
FIGURE 14 is a schematic electrical diagram of the controls and actuators for the respective clamps.

The electrical control system for controlling the valves 118, 120 and 122 to therefore control the position of the clamps on east pedestal 12, west pedestal 14 and horizontal truss 18 is illustrated schematically in FIGURE 14. In FIGURE 14 the letters PL indicate position lights, the letters LS indicate limit switches, the letters CR indicate control relays, and actuating solenoids are indicated by a conventional symbol and the designation Sol. Switches which are normally closed have a diagonal line extending thereacross. For convenience, the switches controlled by the various control relays have prefixes CR preceding the number of the switch. The letters PB indicate push button switches and appear in their normal position in the diagram.

In the diagram FIGURE 14, there are base wires 162 and 164 and horizontal wires indicating separate control circuits. These separate control circuits are numbered substantially consecutively as circuits 166 to 190. Circuit 166 has a position light PL4 therein which indicates the power is on and current is available for the remainder of the circuits. Circuit 168 includes limit switch LS1 which is actuated by position sensor 28 and energizes position light PL1. Circuit 170 includes limit switch LS2 and position light PL2. The limit switch LS2 is actuated by position sensor 30. Circuit 172 includes limit switch LS3 and position light PL3. Limit switch LS3 is actuated by position sensor 32. Therefore, when position sensors 28, 30 and 32 close limit switches LS1, LS2 and LS3, position lights PL1, PL2 and PL3 are on, indicating that the glass sheet 26 is in the proper planar relationship relative to frame 10.

Circuit 174 includes limit switches LS4 and LS5 which are associated with the weight sensors 22 adjacent east pedestal 12. When limit switches LS4 and LS5 are closed, control relay CR1 is energized. Circuit 176 includes limit switches LS6 and LS7 and control relay CR2. The limit switches LS6 and LS7 are actuated by weight sensors 22 adjacent west pedestal 14. Therefore, when the weight of glass sheet 26 closes limit switches LS4, LS5, LS6 and LS7, control relays CR1 and CR2 are energized.

Circuit 180 includes normally open switch CR1B, normally closed switch CR3D, and actuating solenoid Sol 1A. When control relay CR1 in circuit 174 is energized, switch CR1B is closed, completing circuit 180 to energize Sol 1A and actuate valve 118 (see FIGURE 15) to move piston 46 inwardly in cylinder 44 and close the east pedestal clamps 24. Circuit 182 includes normally open switch CR1C, normally closed switch CR4D, and Sol 2A. There is a bypass circuit 194 around switch CR1C in circuit 182 which includes normally open switch CR2E. Therefore, if either control relay CR1 or control relay CR2 are energized, both switch CR1C and CR2E are closed, thereby completing circuit 182 and energizing Sol 2A to actuate valve 120 and close the clamps associated with the horizontal truss 18. Circuit 184 includes normally open switch CR2B, normally closed switch CR5D, and Sol 3A. When control relay CR2 in circuit 176 is energized, normally open switch CR2B is closed and circuit 184 is completed to actuate Sol 3A and close the clamps associated with the west pedestal 14.

With the above described circuitry, the weight of the glass sheet 26 on the weight sensors 22 closes the clamps associated with the east pedestal 12, west pedestal 14, and horizontal truss 18.

Circuit 186 includes normally closed switch CR1D. Sol 1B is arranged to open clamps associated with the east pedestal 12 (see FIGURE 15). Switch CR1D is opened by the control relay CR1 when limit switches LS4 and LS5 are closed. There is a bypass circuit 196 around switch CR1D in circuit 186 which includes normally open switch CR3E. Similarly, circuit 188 includes normally closed switches CR1E and CR2D and Sol 2B. Sol 2B is arranged to open top clamps associated with the horizontal truss 18. Switches CR1E and CR2D are operated by control relays CR1 and CR2 in circuits 174 and 176. There is a bypass circuit 198 around switches CR1E and CR2D.

Circuit 198 includes normally open switch CR4E which is closed by control relays CR4, as later described. Circuit 190 includes normally closed switch CR2C and Sol 3B. Normally closed switch CR2C is opened by control relay CR2 in circuit 176. Sol 3B upon actuation opens the clamps associated with west pedestal 14. There is a bypass circuit 200 around normally closed switch CR2C. Circuit 200 includes switch CR5E which is closed by means of control relay CR5, later described. Solenoids 1B, 2B and 3B are deenergized when the control relays CR1 and CR2 in circuits 174 and 176 are energized so that the clamps remain closed when the weight sensors close the respective limit switches LS4, LS5, LS6 and LS7.

The circuitry to open the clamps associated with east pedestal 12, west pedestal 14, and horizontal truss 18 to inspect the surfaces of the glass therebeneath will now be described.

Circuit 178 includes the various relays to open the individual sets of clamps associated with the pedestals and the horizontal truss. Circuit 178 includes push button switches PB1 and PB2 arranged preferably on opposite sides of the frame. The position of the switches PB1 and PB2 are normally closed. Circuit 178 includes three parallel circuits 202, 204 and 206. Circuit 202 is arranged to open the clamps on the east pedestal 12 while the clamps on the west pedestal 14 and horizontal truss 18 are maintained closed. The circuit 204 opens the clamps associated with the horizontal truss 18 while the clamps on the east pedestal 12 and west pedestal 14 remain closed. Circuit 206 opens the clamps on the west pedestal 14 while the clamps on the east pedestal 12 and horizontal truss 18 remain closed.

Circuits 202, 204 and 206 are connected to base wire 164 at one end and to a common wire 208 at the other end. The circuit 178 includes a normally open switch CR1A which is closed by control relay CR1 in circuit 174. Circuit 202 includes normally open push button switch PB3 and normally closed switches CR4B and CR5B. There is a holding circuit 210 around normally open push button switch PB3 which includes normally open switch CR3A. Switch CR3A is closed by a control relay CR3 in circuit 202. To open the clamps associated with the east pedestal 12, push button switches PB1 and PB2 in circuit 178 are closed. Control relay CR1 is previously energized to close switch CR1A. Push button switch PB3 is closed and normally closed switches CR4B and CR5B remain closed to energize control relay CR3. Control relay CR3 closes switch CR3A around push button switch PB3. Control relay CR3 closes switch CR3E in bypass circuit 196 to energize Sol 1B and opens switch CR3D in circuit 180 to deenergize Sol 1A. In this manner Sol 1B is energized and the clamps associated with east pedestal 12 are opened. The clamps associated with east pedestal 12 remain open until one of the push button switches PB1 or PB2 in circuit 178 is opened to denergize circuit 202 and holding circuit 210.

In circuit 202 there are normally closed switches CR4B and CR5B that are controlled by control relays CR4 and CR5 in circuits 204 and 206 respectively. If circuit 204 or circuit 206 is energized, indicating, as later described, that the clamps associated with horizontal truss 18 or clamps associated with west pedestal 14 are open, the respective switch CR4B or CR5B is then opened and circuit 202 is opened, preventing the energization of solenoid 1B thereby maintaining clamps associated with east pedestal 12 in a closed position.

To open clamps associated with horizontal truss 18, circuit 204 is energized by closing normally open switch PB4 in circuit 204 or push button switch PB5 in the parallel circuit 212. If control relay CR3 in circuit 202 and control relay CR5 in circuit 206 are deenergized, switches CR3B and CR5C in circuit 204 are closed and the closing of either switch PB4 or PB5 completes the circuit and energizes relay coil CR4. Control relay CR4 closes switch CR4A in holding circuit 214 so that switches PB4 and PB5 may again be opened. Control relay CR4 closes switch CR4E to bypass switches CR1E and CR2D in circuit 188 to energize Sol 2B and opens switch CR4D in circuit 182 to deenergize Sol 2A and thereby open the clamps associated with the horizontal truss 18. If either control relay CR3 in circuit 202 or control relay CR5 in circuit 206 is energized, the circuit 204 cannot be completed to open the clamps associated with horizontal truss 18. To close the clamps associated with horizontal truss 18, push button switch PB1 or push button switch PB2 in circuit 178 is opened, thereby deenergizing circuit 202 and control relay CR3.

To open the clamps associated with west pedestal 14, circuit 206 is energized by closing normally open switch PB6 in circuit 206. If control relay CR3 in circuit 202 and control relay CR4 in circuit 204 are deenergized, switches CR3C and CR4C remain normally closed. The closing of push button switch PB6 completes circuit 206 to energize control relay CR5. Switch CR5A in holding circuit 216 and switch CR5E in bypass circuit 200 are closed by control relay CR5. Switch CR5A completes holding circuit 216 around push button switch PB6. Control relay CR5 closes switch CR5E to complete circuit 190 and energize solenoid 3B to open the clamps associated with west pedestal 14. Control relay CR5 opens switch CR5D in circuit 184 to deenergize solenoid 3A so that the clamps associated with the west pedestal are opened. In a similar manner if either control relay CR3 in circuit 202 or control relay CR4 in circuit 204 is energized, switches CR3E and CR5E in circuit 206 would be opened, thereby preventing the energization of control relays CR5 in circuit 206 so that the clamps associated with the west pedestal 14 would not be opened by closing push button PB6. With the above described circuitry, it is possible to only open one set of clamps, that is, clamps associated with either the east pedestal 12 or the west pedetsal 14, or the horizontal truss 18.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. Apparatus for supporting glass sheets in a substantially vertical position comprising an upstanding frame member having a pair of spaced vertical pedestals and a horizontal truss member secured to the top portions of said pedestals, clamp means connected to both of said pedestals and said horizontal truss member and extending inwardly therefrom, said clamp means arranged upon engagement to support said glass sheet within said upstanding frame, said clamp means having portions arranged to clamp the peripheral edge portion of said glass sheet, means to selectively disengage said clamp means connected to said horizontal truss member and said pedestals to expose the surface of said glass therebetween while maintaining the remaining clamp means engaged to support said glass sheet.

2. Apparatus for supporting glass sheets as set forth in claim 1 in which said clamp means secured to said horizontal truss member and said vertical pedestals includes a plurality of clamps having a front surface engaging portion and a rear surface engaging portion, means connecting said front surface engaging portion of said clamps on said horizontal truss member, means connecting said front surface engaging portion of said clamps on one of said vertical pedestals and means connecting said front surface engaging portion of said clamps on said other vertical pedestal, and means to actuate said last named means on said horizontal truss member and said vertical pedestals to move said front surface engaging portion of said clamps toward and away from the front surface of said glass sheet.

3. Apparatus as set forth in claim 2 in which said clamps have separate means to move said rear surface engaging portions away from the rear surface of said glass sheets.

4. Apparatus as set forth in claim 1 which includes a plurality of edge supporting pads positioned within the periphery of said frame member, said pads arranged to support the lower edge of said glass sheet, position sensors associated with said edge supporting pads and said horizontal truss member, said position sensors arranged to provide a signal when said glass sheet is in a substantially vertical plane within the periphery of said frame member.

5. Apparatus as set forth in claim 4 in which at least some of said edge supporting pads include weight sensor means associated therewith, said weight sensor means arranged to be actuated by the weight of said glass sheet and to provide a signal when said glass sheet is positioned thereon.

6. Apparatus as set forth in claim 1 which includes interlock means to maintain a sufficient number of said clamp means clamped to said glass sheet to support said glass sheet in a substantially vertical position while said weight sensor means is actuated.

7. Apparatus for supporting glass sheets in a substantially vertical position for visual inspection thereof comprising an upstanding frame having a pair of spaced vertical members and a horizontal member secured to the top portions of said vertical members, each of said members having a plurality of spaced clamps extending inwardly therefrom, said clamps arranged upon engagement to support said glass sheet within said upstanding frame, said clamps including a front surface engaging portion and a rear surface engaging portion, said members each having means to interconnect said front surface engaging portions for simultaneous pivotal movement relative to said respective member, separate means to actuate said last named means on each of said members to move said clamp front surface engaging portions into clamping engagement with the front surface of said glass sheet and to move said clamp front surface engaging portions away from said front surface of said sheet.

8. Apparatus as set forth in claim 7 in which said clamp rear surface engaging portions are pivotally connected to said respective frame members, and manually operated lever means connected to said clamp rear surface engaging portions and operable to separately pivot each of said clamp rear surface engaging portions away from the rear surface of said glass sheet.

9. Apparatus as set forth in claim 7 in which said means to interconnect said front surface engaging portions of said clamps on said respective frame member includes a rod rotatably secured to said respective frame member and nonrotatably secured to said front surface engaging portion of said clamps associated with said respective frame member.

10. Apparatus as set forth in claim 9 which includes fluid pressure actuated means to rotate said rod relative to said respective frame member, said fluid pressure actuator means including a crank arm pivotally secured at one end to an end portion of a piston rod and nonrotatably secured at the other end to said rod connected to said clamp front engaging portions.

11. Apparatus as set forth in claim 7 which includes edge supporting pads positioned within the periphery of said frame member in spaced parallel relation to said horizontal member, said pads arranged to support the lower edge of said glass sheet, weight sensors including switch means associated with said edge supporting pads, said switch means arranged to be closed by the weight of said glass sheet, a control circuit including said switch means and clamp closing solenoid actuators to actuate said clamp front surface engaging portions on said respective frame members so that the weight of said glass sheet closes said switch means and energizes said solenoids to move said respective clamp engaging surface into clamping engagement with said glass sheet.

12. Apparatus as set forth in claim 11 which includes clamp opening solenoid actuators to actuate said clamp front surface engaging portion on said respective frame members and move said respective clamp front engaging surface away from said glass sheet, and interlock means in said circuit which maintains said clamp opening solenoid actuators deenergized when said weight sensor switch means are closed.

13. Apparatus as set forth in claim 12 which includes separate bypass circuits arranged to bypass said interlock means and actuate one of said clamp opening solenoids while said weight sensor switch means are closed.

14. Apparatus for supporting sheet-like material comprising a holder having a pair of spaced vertical members and a horizontal top member connecting said vertical members, sheet supporting means connected to said vertical members and said top member, said supporting means having portions extending inwardly of said holder and arranged to support said sheet-like material, means to disengage portions of said supporting means to expose the surface of said sheet-like material therebeneath while maintaining the remainder of said supporting means engaged to said sheet-like material, and weight sensor means associated with said holder and arranged to be actuated by the weight of said sheet-like material and to provide a signal and actuate portions of said support means to engage said sheet-like material and support the same in said holder when said sheet-like material is positioned thereon.

15. Apparatus for supporting sheet-like material comprising a holder having a pair of spaced vertical members and a horizontal top member connecting said vertical members, sheet-supporting means connected to said vertical members and said top member, said supporting means having portions extending inwardly of said holder and arranged to support said sheet-like material, means to disengage portions of said supporting means to expose the surface of said sheet-like material therebeneath while maintaining the remainder of said supporting means engaged to said sheet-like material, weight sensor means associated with said holder and arranged to be actuated by the weight of said sheet-like material and to provide a signal when said sheet-like material is positioned thereon and interlock means to maintain a substantial portion of said support means in an engaged position while said weight sensor means is actuated.

(References on following page)

References Cited by the Examiner

UNITED STATES PATENTS

| | | | |
|---|---|---|---|
| 970,565 | 9/10 | Smith | 116—98 |
| 1,133,985 | 3/15 | McComish | 116—124 X |
| 1,272,156 | 7/18 | Waterloo | 88—14 |
| 1,508,468 | 9/24 | Oakes | 88—14 |
| 1,798,573 | 3/31 | Wright | 88—14 |
| 2,379,213 | 6/45 | Black | 211—41 X |
| 2,618,905 | 11/52 | Dicks | 211—41 X |
| 2,908,474 | 10/59 | Chiarito | 211—141 X |

CLAUDE A. LE ROY, *Primary Examiner.*

FRANK L. ABBOTT, *Examiner.*